Nov. 24, 1964   O. GUZE, JR   3,158,017
BURGLAR PROOF SAFE LOCKING BOLT ASSEMBLY
Filed Feb. 15, 1962
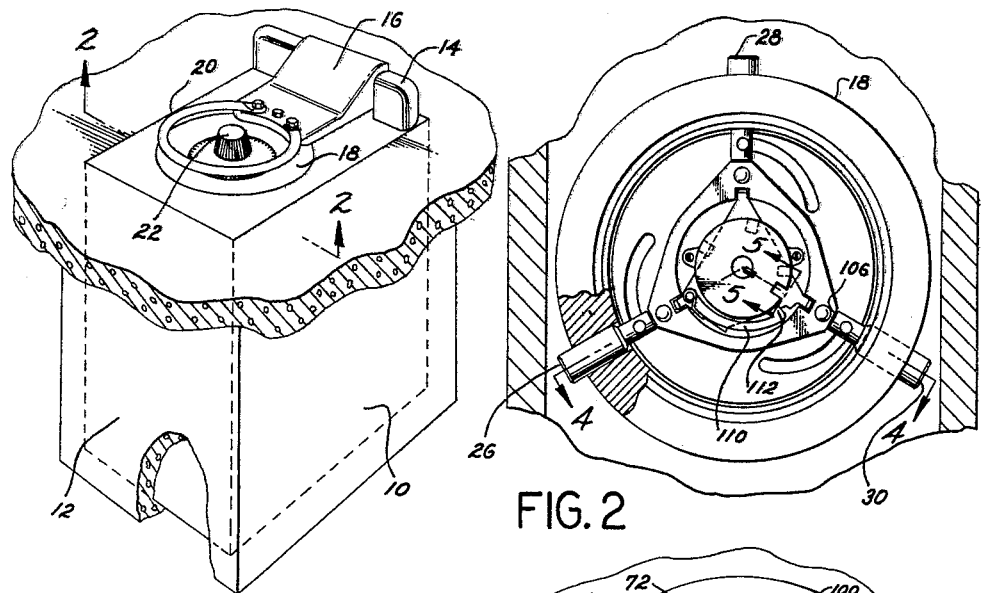
FIG. 1
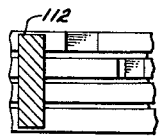
FIG. 5
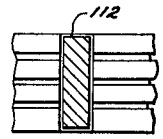
FIG. 6
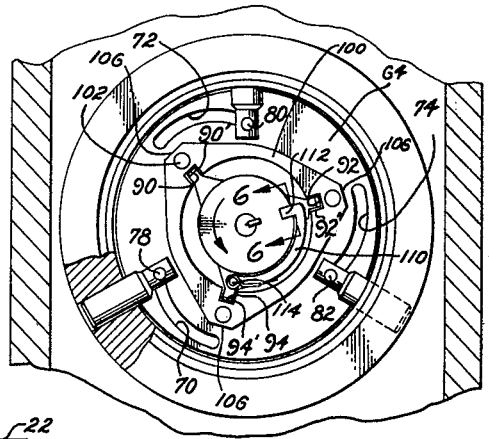
FIG. 2
FIG. 3
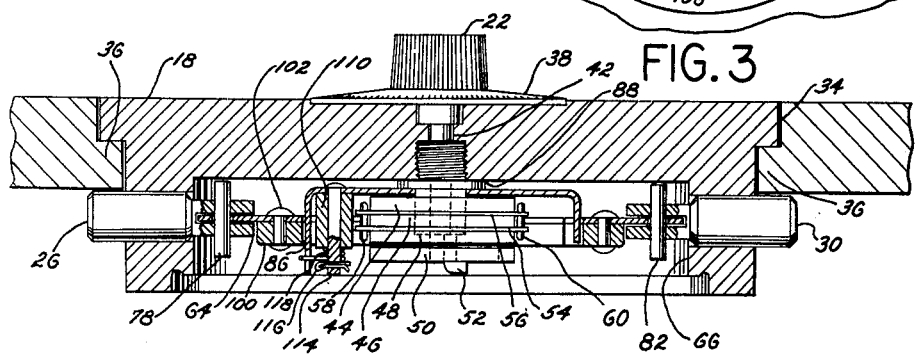
FIG. 4
INVENTOR.
OSCAR GUZE JR.
BY
Boniard I. Brown
ATTORNEY ём
United States Patent Office 3,158,017
Patented Nov. 24, 1964

3,158,017
BURGLAR PROOF SAFE LOCKING BOLT ASSEMBLY
Oscar Guze, Jr., 226 N. Vincent Ave., West Covina, Calif.
Filed Feb. 15, 1962, Ser. No. 173,470
6 Claims. (Cl. 70—119)

The present invention relates generally to locking bolt assemblies for combination safes or vaults; more particularly, the invention relates to improvement in locking bolt assemblies which cooperate with assemblies of retractable bolts to prevent inward movement of the bolt under impact.

Safes, vaults, and the like which utilize combination locks and the doors of which are secured or locked by means of assemblies of cam-operated extendable and retractable bolts are well-known in the art. A recognized deficiency in the art is that such safes and vaults have been subject to attack and to being opened by the burglarizing technique wherein the walls or other portions of a safe opposite the extended locking bolt are drilled or otherwise removed to gain access to the bolt. Once such access has been attained, the bolts are driven inward by using such tools as a hammer and a punch, the bolt being engaged or retained behind a shoulder about the door when in their locked positions, the door may be opened after the bolts are driven inwardly. The force of the impact on the bolts bends or collapses the cam-operated actuating mechanism for the bolts, so that the bolts move inwardly and release the door.

Another well-known deficiency of such prior art locking bolt assemblies is that the slamming or forcible closing of the safe door, when the locking bolts are in their extended locking positions can result in deforming or bending the cam mechanism so that the mechanism and the locking bolts will not operate properly.

It is therefore an object of the present invention to overcome the aforementioned deficiencies of the prior art.

An object of this invention is the provision of an improved locking bolt assembly for use in burglar-proof safes and vaults which provide greatly improved resistance to attack by driving locking bolts inwardly.

It is an object of the invention to provide an improved locking bolt assembly according to the foregoing object wherein a reinforcing member receives burglarizing bolt-driving impacts and transmits such impacts in such manner as to prevent deformation of a bolt-actuating mechanism.

An object of the present invention is the provision of an improved locking bolt assembly which substantially prevents damage or impairment by impact upon locking bolts caused by the forcible closing or slamming of the door of a safe or vault when the locking bolts are extended in their locking positions.

Other objects, features and advantages of the present invention will become apparent to those versed in the art from a consideration of the following description, the appended claims, and the accompanying drawings wherein:

FIGURE 1 is a diagrammatic perspective view of a safe having the invention embodied therein, the safe being embedded in concrete;

FIGURE 2 is a partial sectional view taken at line 2—2 of FIGURE 1, showing the locking bolt assembly of the invention with the locking bolts extended;

FIGURE 3 is a view similar to the view of FIGURE 2, showing the locking bolt assembly with the locking bolts retracted;

FIGURE 4 is a sectional view taken at line 4—4 of FIGURE 2;

FIGURE 5 is a fragmentary sectional view taken at line 5—5 of FIGURE 2; and

FIGURE 6 is a fragmentary sectional view taken at line 6—6 of FIGURE 3.

Referring to the drawing, and particularly to FIGURE 1, there is shown a burglar-proof safe or vault 10 which is embedded in concrete for an added protection against attack, and to prevent the transporting of the safe. A fixture 14 extends from the upper end wall of the safe and provides a hinge pin for a hinge 16 which is affixed to a safe door 18. Attached to the hinge 16 by bolts is a circular operating handle 20. A knob 22 of a combination lock mechanism extends outwardly from the safe door.

FIGURES 2 through 4 show the improved locking bolt assembly and the actuating mechanism for the safe door. The circular door 18 is movable about its hinge by means of the operating handle 20 and fits into a circular opening in the upper end wall of the safe, as shown. Three locking bolts 26, 28, 30, are slidably mounted in respective radial bores in the circular door and are retractable inwardly and extendable outwardly. As shown in FIGURE 4, the door has a peripheral shoulder 34 which fits into and engages a cooperating shoulder 36 in the safe wall. The locking bolts, when in their extended positions, are secured behind wall shoulder 36, as shown, and thus secure the door against opening.

Secured to the knob 22 of the combination lock mechanism is a graduated and numbered dial 38. A knob 22 operates a shaft 42 which extends through an axial bore in door 18. Coaxially mounted on the shaft 42 are tumblers 44, 46, 48, and 50 of the combination lock mechanism. The tumblers and the combination lock mechanism are conventional, and the operation thereof is well-known in the art. A key 52 in the end of the shaft 42 secures the tumblers on the shaft. Disk-like plates 54, 56, are interposed between the tumblers 44 and 46, and between the tumblers 46 and 48 respectively, and are held together by brackets, as indicated at 58 and 60.

An operating cam plate 64 for actuating the locking bolts 26, 28, and 30, is positioned in a large circular recess 66 in the door. Equi-angularly spaced radial openings extend from the recess through the door and accommodate the respective locking bolts. Adjacent to its periphery, the cam has arcuate cam slots 70, 72, and 74, which are eccentric in relation to the shaft 42. The inner ends of the bolts 26, 28, and 30 are slotted to form yokes, as shown in FIGURE 4, and the edge of the cam plate 64 fits into or is received in the slots.

Three pins 78, 80, 82, extend transversely through the respective yokes thus provided and through the respective slots 70, 72, and 74. From the geometric relations of the parts, it will be observed that the rotation of the cam plate 64 through a predetermined angle actuates the pins 78, 80, and 82 to move the bolts radially. When the cam plate is rotated in one direction, the locking bolts are retracted radially inwardly, and when the cam plate is rotated in the opposite direction, the locking bolts are extended radially outwardly to their locking positions.

A spider cam 86 is mounted on the shaft 42 adjacent to the tumblers and adjacent to a bushing or washer 88 which is flush against the inner surface of the large circular recess 66 of the door. The spider cam 86 has three equi-angularly spaced radially extending fingers which have respective axially extending end portions 90, 92, and 94, as best shown in FIGURES 3 and 4. These end portions fit in or engage respective notches 90', 92', and 94' in the cam plate 64 and in registering notches in a reinforcing and punch-proofiing ring 100, as shown. The ring 100, which is an important feature of the present invention, has a generally triangular external configuration and a circular inter-opening or edge, as shown in FIGURES 2 and 3. A ring is preferably formed of heavy gage metal and is welded and riveted to the cam plate 64. As shown, there are preferably three rivets 102 spaced 120° apart. Adjacent to each of the rivets is a peripheral flat surface 106 (FIGURE 3), each of the three peripheral flat surfaces being adjacent to an outwardly extending part of one of the eccentric cam slots 70, 72, 74.

The conventional combination lock mechanism includes a dog member 110 which has a radially inwardly extending end finger 112. The operating dog member 110 is pivoted on a pin or shaft 114 mounted on the spider cam 86, as shown in FIGURE 4. As indicated in FIGURE 4, the dog 110 may preferably be retained by a cotter pin 116 and a spring 118.

In this conventional combination lock structure, each of the tumblers 44 through 50 has a rectangular notch or slot in its outer edge which is adapted to receive a radial end finger 112 of the dog 110. When all the notches in the different tumblers are not in alignment, as indicated in FIGURES 2 and 5, the dog 110 is held in an outward rotative position, as shown in FIGURES 2 and 5. When the tumblers are in such relative positions that their respective notches are in registration or alignment, the end finger 112 of the dog 110 is moved inwardly under the urging of the spring 118, and moves into the notches, as indicated in FIGURES 3 and 6. This registration or alignment of the tumbler notches occurs when the combination knob 22 has been operated in accordance with the combination for which the lock has been set. The combination of the lock may, for example, be four counter-clockwise or left rotations to a certain number, three clockwise or right rotations to a second number, two counter-clockwise or left rotations to a third number, and one clockwise or right rotations to a fourth number. After the notches are in registration and the dog end portion 112 is engaged in the notches, the rotation of the shaft 42 by means of the knob 22 rotates the tumblers to actuate the dog 110 to drive the spider cam 86 and the cam plate 64, thereby extending or retracting the locking bolts 26, 28, 30, by means of the cam slots 70, 72, 74, in the manner hereinbefore described. That is, the rotation of the cam plate 64 causes the cam slots to effect actuation of the locking bolts. When the locking bolts are in their extended locking positions, as shown in FIGURES 2 and 4, the transverse pins 78, 80, and 82 are at the outermost positions in the cam slots, as indicated in FIGURE 2. The inner ends of the locking bolts 26, 28, 30, are positioned adjacent to or in engagement with the flat surfaces 106 of the reinforcing member or ring 100. With these members in the positions shown in FIGURE 2, it will be observed and understood that when one of the locking bolts is urged, hammered, or punched inwardly, its inner end engages the flat surface of the reinforcing member 100. Therefore, if a burglar after drilling through, or otherwise removing a portion of the side wall of the safe to gain access to the end of the locking bolt, attempts to drive, force, or hammer the locking bolt inwardly by means of a hammer and punch or other tools, inward movement of the bolt will be resisted and prevented by reinforcing ring 100, which is of configuration that it will not collapse or be deformed by such stress or impact, and will prevent deformation of the cam plate 64 and other associated structure. It will be particularly noted that the major portion or substantial portion of the impact or force on a bolt is transferred to the other two bolts through the reinforcing ring, and thereby transmitted to the wall of the safe against which the other two bolts may be forced by the force or impact applied to the bolts under attack. This transmission of the load or impact on the bolt under attack to the other two bolts and thence to the wall of the safe itself provides very high resistance to the forcing inward of any one locking bolt, and therefore, tends effectively to prevent entering the safe. The structure is therefore one which is virtually immune to attack by burglars and which cannot be defeated by known burglarizing technique.

A mechanism or device of the invention prevents damage or deformation of the cam mechanism when the safe door is accidentally dropped or slammed into the door opening of the safe. In a manner analogous to that hereinbefore described, a reinforcing ring or member 100 resists deformation of the cam plate and associated structure when the door is dropped or slammed into the door opening of the safe while the locking bolts are in their outward extending positions.

From the foregoing, those versed in the art will readily appreciate that the present invention achieves the objects and realizes the advantages hereinbefore mentioned. Additional advantages are apparent from the detailed description. A structure involved in the invention is relatively simple, is economically fabricated and conveniently installed in conventional safe or vault mechanisms.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art and the invention is entitled to the broadest interpretation within the terms of the appended claims.

The inventor claims:

1. A locking bolt assembly comprising a door, means comprising a plurality of bolts retractable inwardly and extendable outwardly relative to the door, said bolts in their extended positions engaging wall means to lock the door, bolt-actuating means for extending and retracting the bolts, and a punch proofing member carried by and actuable with said bolt-actuating means, and said member being configurated to provide surfaces which are positioned closely juxtaposed against the inner ends of the respective locking bolts when the bolts are in their extended locking positions, whereby an inward force against one of the locking bolts is received by said member, whereby a substantial part of the load is transmitted to one or more of the other bolts and to associated structure, whereby inward movement of said bolt is prevented.

2. A locking bolt assembly according to claim 1, wherein the bolt-actuating means comprises an angularly movable cam, and said punch-proofing member comprises a relatively heavy reinforcing element secured to the cam, said member being symmetrical to cooperate with symmetrically angular spaced locking bolts, whereby the inward force on one bolt is transmitted to one or more other bolts and to associated structure.

3. A locking bolt assembly according to claim 2, wherein said reinforcing element is so configurated that upon movement of the bolt-actuating cam from its bolt-extending position, said surfaces of the punch-proofing reinforcing element are moved away from the inner ends of the locking bolts and said bolts are permitted to move inwardly.

4. A locking bolt assembly according to claim 2, and further including a combination lock mechanism for operating the bolt-actuating cam and the punch-proofing reinforcing element.

5. A locking bolt assembly according to claim 2 wherein the bolts are radially movable, and wherein the punch-proofing reinforcing element has flat surfaces disposed in planes normal to the radially disposed axes of the respective bolts when the bolts are in their extended positions.

6. A locking bolt assembly according to claim 5, wherein the reinforcing element is secured to the cam by means of rivets, and wherein the reinforcing element has a flat peripheral surface adjacent to each rivet and positioned to be juxtaposed against an inner end of one of the bolts when the bolt is in its extended locking position.

References Cited in the file of this patent

UNITED STATES PATENTS

| | | |
|---|---|---|
| 203,232 | Worthington | Apr. 30, 1878 |
| 296,985 | Maycock | Apr. 15, 1884 |
| 1,542,137 | Hoffmann | June 16, 1925 |
| 1,643,365 | Bell | Sept. 27, 1927 |

FOREIGN PATENTS

| | | |
|---|---|---|
| 630,811 | Germany | June 6, 1936 |
| 652,904 | Great Britain | May 2, 1951 |